United States Patent
Pan et al.

(10) Patent No.: US 10,671,857 B2
(45) Date of Patent: Jun. 2, 2020

(54) METHODS AND SYSTEMS FOR VIDEO SURVEILLANCE

(71) Applicant: ZHEJIANG DAHUA TECHNOLOGY CO., LTD., Hangzhou, Zhejiang (CN)

(72) Inventors: Huadong Pan, Zhejiang (CN); Miao Cheng, Zhejiang (CN); Shizhu Pan, Zhejiang (CN); Xingming Zhang, Zhejiang (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 219 days.

(21) Appl. No.: 15/737,283

(22) PCT Filed: May 23, 2016

(86) PCT No.: PCT/CN2016/082963
§ 371 (c)(1),
(2) Date: Dec. 16, 2017

(87) PCT Pub. No.: WO2016/202143
PCT Pub. Date: Dec. 22, 2016

(65) Prior Publication Data
US 2018/0173965 A1 Jun. 21, 2018

(30) Foreign Application Priority Data

Jun. 17, 2015 (CN) .......................... 2015 1 0334845
Jun. 17, 2015 (CN) .......................... 2015 1 0335051
(Continued)

(51) Int. Cl.
*G06K 9/00* (2006.01)
*G08B 13/196* (2006.01)
(Continued)

(52) U.S. Cl.
CPC .......... *G06K 9/00771* (2013.01); *G06T 7/285* (2017.01); *G06T 7/292* (2017.01);
(Continued)

(58) Field of Classification Search
CPC ...... G06K 9/00771; G06K 2009/00738; G06T 7/55; G06T 7/292; G06T 2207/10028;
(Continued)

(56) References Cited

U.S. PATENT DOCUMENTS 5,521,633 A    5/1996  Nakajima et al.
8,890,936 B2 * 11/2014  Sharma ................ H04N 13/239
                                                    348/46
(Continued)

FOREIGN PATENT DOCUMENTS

CN    101835035 A    9/2010
CN    101872524 A    10/2010
(Continued)

OTHER PUBLICATIONS

European Search Report in European Application No. 16810884.3 dated May 24, 2018, 5 pages.
(Continued)

*Primary Examiner* — Van D Huynh
(74) *Attorney, Agent, or Firm* — Metis IP LLC

(57) ABSTRACT

A system for video surveillance includes an image sensor configured capture an image including a reference zone and a memory device that stores instructions. The system also includes one or more processors that are configured to execute the instructions to determine 3D coordinates of a target comprised in the image and determine 3D coordinates of the reference zone. The one or more processors are further configured to identify an event according to the 3D coordinates of the target and the 3D coordinates of the reference zone.

20 Claims, 7 Drawing Sheets

(30) Foreign Application Priority Data

Jun. 17, 2015 (CN) .......................... 2015 1 0336391
Jun. 17, 2015 (CN) .......................... 2015 1 0336397

(51) Int. Cl.
| | | |
|---|---|---|
| H04N 7/18 | (2006.01) | |
| G08B 5/36 | (2006.01) | |
| G06T 7/285 | (2017.01) | |
| G08B 25/08 | (2006.01) | |
| G06T 7/55 | (2017.01) | |
| G06T 7/292 | (2017.01) | |

(52) U.S. Cl.
CPC .................. *G06T 7/55* (2017.01); *G08B 5/36* (2013.01); *G08B 13/19608* (2013.01); *G08B 13/19613* (2013.01); *G08B 25/08* (2013.01); *H04N 7/181* (2013.01); *G06K 2009/00738* (2013.01); *G06T 2207/10028* (2013.01); *G06T 2207/30232* (2013.01)

(58) Field of Classification Search
CPC .......... G06T 2207/30232; G06T 7/285; G08B 13/19613; G08B 13/19608; G08B 5/36; G08B 25/08; H04N 7/181
USPC ........................................................ 382/103
See application file for complete search history.

(56) References Cited

U.S. PATENT DOCUMENTS

| | | | | |
|---|---|---|---|---|
| 2003/0020808 | A1* | 1/2003 | Luke ........................ | G06T 7/20 |
| | | | | 348/47 |
| 2006/0233436 | A1* | 10/2006 | Ma ..................... | G06K 9/00624 |
| | | | | 382/154 |
| 2007/0217780 | A1* | 9/2007 | Hirooka .......... | G08B 13/19606 |
| | | | | 396/287 |
| 2008/0043106 | A1* | 2/2008 | Hassapis ............ | G06K 9/00771 |
| | | | | 348/153 |

FOREIGN PATENT DOCUMENTS

| | | | |
|---|---|---|---|
| CN | 103578133 | A | 2/2014 |
| CN | 103716579 | A | 4/2014 |
| CN | 103986905 | A | 8/2014 |
| CN | 104156973 | A | 11/2014 |
| CN | 104902246 | A | 9/2015 |
| CN | 104935893 | A | 9/2015 |
| CN | 104954747 | A | 9/2015 |
| CN | 104966062 | A | 10/2015 |
| JP | 2005259173 | A | 9/2005 |
| JP | 2007235485 | A | 9/2007 |

OTHER PUBLICATIONS

First Office Action in Chinese Application No. 201510334845.9 dated Jul. 3, 2017, 21 pages.
First Office Action in Chinese Application No. 201510335051.4 dated Oct. 9, 2017, 20 pages.
First Office Action in Chinese Application No. 201510336391.9 dated Jul. 3, 2017, 33 pages.
The Second Office Action in Chinese Application No. 201510336391.9 dated Dec. 11, 2017, 32 pages.
First Office Action in Chinese Application No. 201510336397.6 dated Aug. 1, 2017, 23 pages.
Tianxin Wu, Several Key Issues in Intelligent Video Surveillance: Master's thesis, Xidian University, Xi'an, Shanxi, China, 2013.
International Search Report in PCT/CN2016/082963 dated Jul. 27, 2016, 4 pages.
Written Opinion in PCT/CN2016/082963 dated Jul. 27, 2016, 5 pages.

* cited by examiner

360

500

METHODS AND SYSTEMS FOR VIDEO SURVEILLANCE

CROSS-REFERENCE TO RELATED APPLICATIONS

This application is a U.S. national stage under 35 U.S.C. § 371 of International Application No. PCT/CN2016/082963, filed on May 23, 2016, designating the United States of America, which claims priority to Chinese Patent Application No. 201510334845.9, filed on Jun. 17, 2015, Chinese Patent Application No. 201510335051.4, filed on Jun. 17, 2015, Chinese Patent Application No. 201510336391.9, filed on Jun. 17, 2015, and Chinese Patent Application No. 201510336397.6, filed on Jun. 17, 2015. Each of the above-referenced applications are hereby expressly incorporated herein by reference to their entireties.

TECHNICAL FIELD

The present disclosure generally relates to video surveillance, more specifically relates to methods and systems for identifying one or more objects based on an image or a video.

BACKGROUND

Video surveillance plays important rules in security systems. Video surveillance may be used in crime prevention, industrial process, traffic monitoring, transport safety, control of retail, etc. Some existing video surveillance techniques detect an object by defining a tripwire in one or more video frames of a video and determining whether the object moves across the tripwire. Although these methods may be easy to implement, there are shortcomings. For example, the existing detection technology may include a tripwire detection and an intrusion detection. The tripwire detection and intrusion detection may identify an event according to a direct determination whether a target intersects with a tripwire. However, an event may not always occur when the target intersects with the tripwire because of the perspective effect of the camera, and thus false alarms may be generated in these circumstances.

SUMMARY

One aspect of the present disclosure is directed to a system for video surveillance. The system includes an image sensor, a memory device and one or more processor. The image sensor is configured to capture an image including a reference zone. The memory device is configured to store instructions. The one or more processors are configured to execute the instructions to determine 3D coordinates of a target comprised in the image. The one or more processors are also configured to execute the instruction to determine 3D coordinates of the reference zone. The one or more processors are further configured to execute the instruction to identify an event according to the 3D coordinates of the target and the 3D coordinates of the reference zone.

Another aspect of the present disclosure is directed to a method for video surveillance. The method includes capturing an image including a reference zone. The method also includes determining 3D coordinates of a target comprised in the image. The method further includes determining 3D coordinates of the reference zone, and identifying an event according to the 3D coordinates of the target and 3D coordinates of the reference zone.

Yet another aspect of the present disclosure is directed to a non-transitory computer readable medium embodying a computer program product, the computer program product comprising instructions configured to cause a computing device to capture an image including a reference zone. The computer program product includes instructions also configured to cause the computing device to determine 3D coordinates of a target comprised in the image. The computer program product includes instructions further configured to cause the computing device to determine 3D coordinates of the reference zone, and identify an event according to the 3D coordinates of the target and 3D coordinates of the reference zone.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
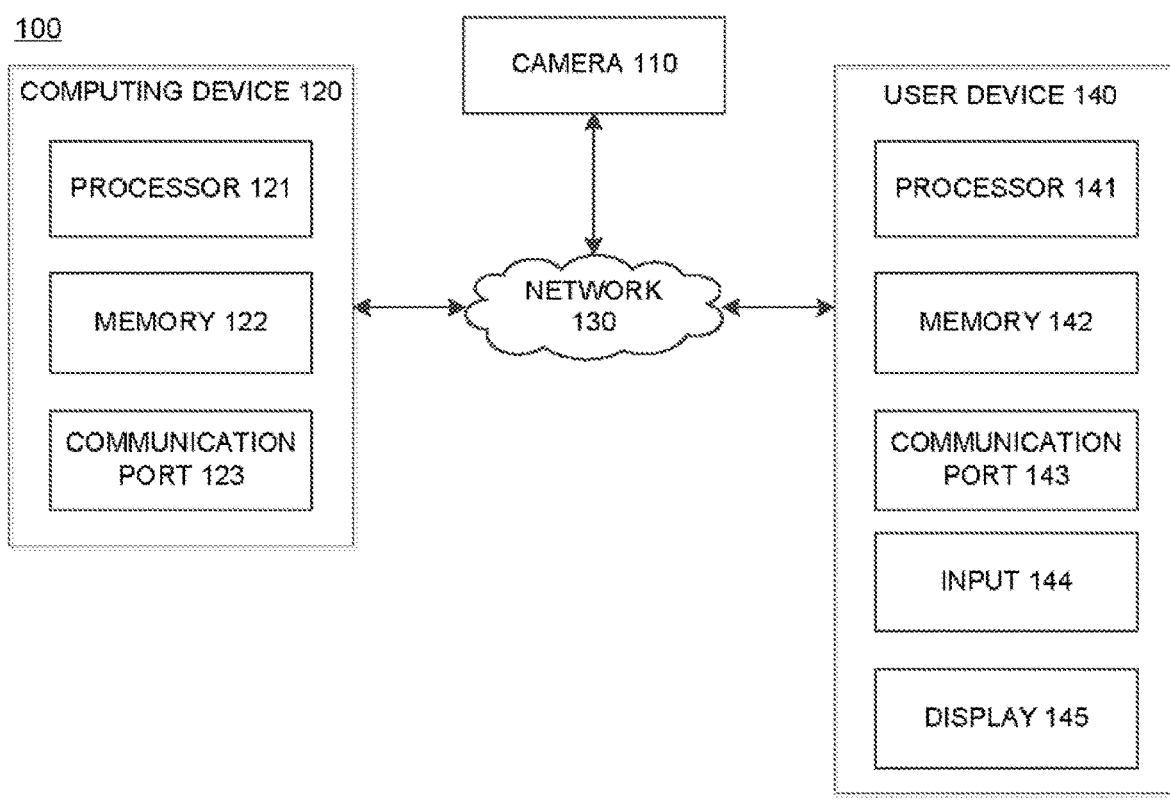
FIG. 1 is a schematic diagram illustrating an exemplary video surveillance system according to some embodiments.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The disclosure is directed to systems and methods for detecting one or more objects based on a video. For example, FIG. 1 illustrates a system 100 including a camera 110, a computing device 120, a network 130, and a user device 140. Camera 110 may be a device configured to capture a video and/or an image. For example, camera 110 may be a digital camera, a web camera, a smartphone, a tablet, a laptop, a video gaming console equipped with a web camera, etc. In some embodiment, camera 110 may include more than one camera configured to capture videos and images. In some embodiment, camera 110 may be configured to capture two-dimensional (2D) images and/or three-dimensional (3D) images. For example, camera 110 may be a static camera, a pan-tilt-zoom camera, a moving camera, a stereoscopic camera, a structured light camera, a time-of-flight camera, etc. In some embodiments, camera 110 may also be a camera equipped with time-of-flight device, a Kinect sensor, a 3D laser scanner, a photographic scanner, etc. The type of camera 110 may vary, depending on the installation location and/or the type of objects to be monitored. In some embodiments, camera 110 may further be configured to capture a video with a native resolution of 320×240, 426×240, 640×360, 480×360, 800×600, 852×640, 960×540, 1024×768, 1280×720, 1280×960, 1280×1024, 1440×1050, 1440×1080, 1600×1200, 1920×1080, 2560×1440, 3840×2160, 5120×2880, 7680×4320, or any other suitable resolutions. It will be understood that the forgoing examples are representative of exemplary embodiments only. The disclosed systems and methods may be implemented to provide enhanced resolution that is greater than the native or standard resolution capability.

In some embodiments, camera 110 may also be configured to transmit the videos and/or images captured to computing device 120 and/or user device 140 via network 130. Alternatively or additionally, camera 110 may be configured to transmit a stream video and/or an image to computing device 120 and/or user device 140 in real time.

In some embodiments, camera 110 and computing device 120 may be packaged in a single device (e.g., system 200 shown in FIG. 2) configured to perform functions of camera 110 and computing device 120 described in this disclosure (and/or the functions of system 200 described in this disclosure). In some embodiments, camera 110 may also include one or more processors and memory configured to perform one or more processes and/or methods described in this disclosure. For example, camera 110 may be configured to capture 2D images at different positions, which may be reconstructed into one or more 3D images as described elsewhere in this disclosure.

In some embodiments, camera 110 may be configured to transmit a first version of a video and/or image with a first shooting angle and a second version of the same video and/or image with a second shooting angle to computing device 120 and/or user device 140. Merely by way of example, camera 110 may be configured to capture a video and/or an image with a tilt angle 60 degrees. Merely by way of example, camera 110 may be configured to capture a video and/or an image with a tilt angle changing from zero to 180 degrees.

Computing device 120 may be a web camera, a digital camera, a computer server, a desktop computer, a notebook computer, a tablet computer, a mobile phone, a personal digital assistant (PDA), or the like. Computing device 120 may include, among other things, a processor 121, a memory 122, and a communication port 123. In operation, processor 121 may execute computer instructions (program code) and perform functions in accordance with techniques described herein. Computer instructions may comprise routines, programs, objects, components, data structures, procedures, modules, and functions, which perform particular functions described herein. For example, processor 121 may receive and analyze a 3D video and/or an image with depth information captured by camera 110. Processor 121 may also receive and analyze 2D videos and/or images captured by camera 110 from different positions or shooting angles. Processor 121 may also determine the 3D coordinates of a pixel or a pixel group. Processor 121 may further determine an event according to the 3D coordinates. Processor 121 may also generate an alert according to the event. In some embodiments, processor 121 may include or be part of one or more known processing devices such as, for example, a microprocessor. In some embodiments, processor 121 may include any type of single or multi-core processor, mobile device microcontroller, central processing unit, etc.

Memory 122 may be configured to store one or more computer programs to be executed by processor 121 to perform exemplary methods disclosed herein. For example, memory 122 may be configured to store program(s) that may be executed by processor 121 to extract image frames from the second version of the video received from camera 110. Memory 122 may also be configured to store data and/or parameters used by processor 121 in methods described in this disclosure. For example, memory 112 may be configured to store 3D coordinate information of the target and/or the reference zone defined by the user. Processor 121 may access the 3D coordinate information stored in memory 112 and detect one or more events based on the 3D coordinate information. In another example, memory 122 may store one or more target patterns for detecting a type of a target. Processor 121 may access the target pattern stored in memory 112 and detect one or more targets based on accessed target pattern data.

Memory 122 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 123 may be configured to transmit to and receive data from, among other devices, camera 110 and user device 140 over network 130. Network 130 may be any type of wired or wireless network that allows transmitting and receiving data. For example, network 130 may be a wired network, a local wireless network, (e.g., Bluetooth™, WiFi, near field communications (NFC), etc.), a cellular network, the Internet, or the like, or a combination thereof. Other known communication methods which provide a medium for transmitting data between separate devices are also contemplated.

User device 140 may be configured to receive data (e.g., image and/or video data) from camera 110 and/or computing device 120 via network 130. For example, user device 140 may be configured to receive an alert from computing device 120 that indicates an event identified by computing device 120. In another example, user device 140 may generate an alert according to the event data received from computing device 120. User device 140 may be any type of computing device. For example, user device 140 may be a smart phone, a tablet, a personal computer, a wearable device (e.g., Google Glass™ or smart watches, and/or affiliated components), or the like, or a combination thereof. In some embodiments, user device 140 and computing device 120 may together be comprised in a computing device configured to perform exemplary functions of user device 140 and computing device 120 disclosed in this application.

User device 140 may comprise, among other things, a processor 141, a memory 142, a communication port 143, an input 144, and a display 145. Processor 141 may execute computer instructions (program code) and perform functions of user device 140 in accordance with techniques described herein. For example, processor 141 may be configured to receive image and/or video data from computing device 120 and/or camera 110 via network 130. Processor 141 may be further configured to receive the event and/or the alert data from computing device 120. For another example, processor 141 may be configured to generate an alert according to the event from computing device 120. Processor 141 may also control display 145 to present the reference zone. Display 145 may be configured, by processor 141, to present the reference zone represented by graphic symbol overlaying on the image and/or video from computing device 120 and/or camera 110. Processor 141 may include or be part of one or more known processing devices such as, for example, a microprocessor. In some embodiments, processor 141 may include any type of single or multi-core processor, mobile device microcontroller, central processing unit, etc.

Memory 142 may be configured to store one or more programs for execution by processor 141. For example, in some embodiments, memory 142 may be configured to store one or more programs for execution by processor 141 to generate an alert according to the event data received from computing device 120. Memory 142 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 142 may be configured to transmit to and receive data from, among other devices, camera 110 and/or computing device 120 over network 130. Input 144 may be configured to receive inputs from the user and transmit the data/signal relating to the received inputs to processor 141 for further processing. Display 145 may be any device configured to display, among other things, videos and/or images in the UI based on the display data fed by processor 141.

Figure 2:
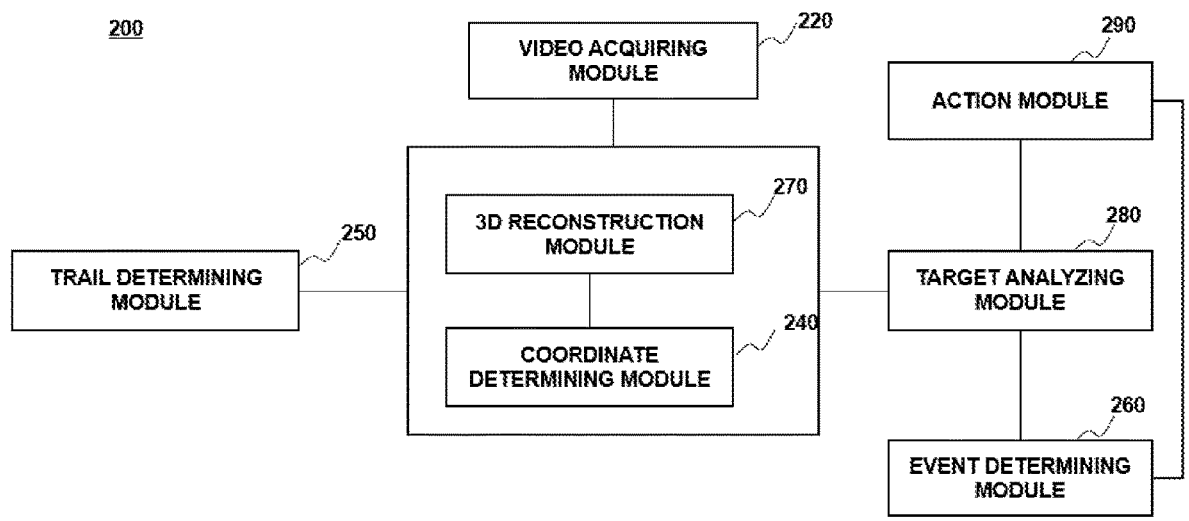
FIG. 2 is a schematic diagram illustrating an exemplary video surveillance system according to some embodiments.

Referring FIG. 2, exemplary video surveillance system 200 may be implemented on computing device 120 and/or camera 110 and configured to perform functions disclosed in this application. Video surveillance system 200 may include a video acquiring module 220, a coordinate determining module 240, a trail determining module 250, an event determining module 260, a 3D reconstruction module 270, a target analyzing module 280, and an action module 290.

Generally, the word "module," as used herein, refers to logic embodied in hardware or firmware, or to a collection of software instructions. The modules described herein may be implemented as software and/or hardware modules and may be stored in any type of non-transitory computer-readable medium or other storage device. In some embodiments, a software module can be compiled and linked into an executable program. It will be appreciated that software modules can be callable from other modules or from themselves, and/or can be invoked in response to detected events or interrupts. Software modules configured for execution on computing devices (e.g., processor 121) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

In some embodiments, video acquiring module 220 may be implemented on camera 110 and be configured to capture one or more videos and/or images. For example, video acquiring module 220 may include a 2D camera (e.g., camera 110 or part thereof) configured to capture one or more videos and/or images. Video acquiring module 220 may be further configured to capture an image or a video at different shooting angles. In some embodiments, video acquiring module 220 may include two or more 2D cameras (e.g., camera 110 or part thereof) configured to capture video(s) and/or image(s) from different positions and/or at different shooting angles. In some embodiments, video acquiring module 220 may also be configured to generate one or more 3D videos and/or 3D images based on 2D video(s) and/or 2D images captured by one or more 2D cameras. In some embodiments, video acquiring module 220 may include one or more 3D cameras (i.e., camera 110 or part thereof) configured to capture video(s) and/or image(s) having depth information. Video acquiring module 220 may include two or more 3D cameras configured to capture 3D images at different positions around the same time.

In some embodiments, video acquiring module 220 may be configured to receive one or more videos and/or images (2D and/or 3D) from camera 110 via network 130. For example, video acquiring module 220 may be configured to receive 2D videos and/or images captured by one 2D camera (e.g., camera 110 or part thereof) at different shooting angles. In some embodiments, video acquiring module 220 may be further configured to receive 2D videos and/or images captured by two or more 2D cameras (e.g., camera 110 or part thereof) from different positions and/or at different shooting angles. In some embodiments, video acquiring module 220 may be configured to receive 2D and/or 3D videos and/or images captured by one or more 3D cameras (e.g., camera 110 or part thereof). Video acquiring module 220 may further be configured to generate one or more 3D images based on 2D images received from camera 110. Alternatively or additionally, 3D reconstruction module 270 may be configured to generate one or more 3D images based on 2D images received from video acquiring module 220 (or camera 110). In some embodiments, 3D reconstruction module 270 may be configured to create one or more 3D images with 2D images using an active method, a passive method, or the like, or any combination thereof. The active method may actively interfere with the reconstructed object, either mechanically or radio metrically using rangefinders. For example, the active method may include a range data method, a mechanical method, or the like, or any combination thereof. The passive method may use a sensor to measure the radiance reflected or emitted by an object's surface to infer the object's 3D structure through image understanding. For example, the passive method may comprise a monocular cues method, a binocular stereo vision, etc.

The video(s) and/or the image(s) acquired by video acquiring module 220 (or 3D image(s) generated by 3D reconstruction module 270) may be transmitted to coordinate determining module 240 for further processing. For example, coordinate determining module 240 may be configured to identify one or more targets included in the video(s) and/or image(s) received from video acquiring module 220 (or 3D reconstruction module 270). In some embodiments, coordinate determining module 240 may further be configured to pre-process the image(s) received from video acquiring module 220 before identifying one or more targets. For example, coordinate determining module 240 may perform de-noising and/or error eliminating processes on the image(s).

In some embodiments, coordinate determining module 240 may further determine the coordinates (2D or 3D) of the target(s) based on the received video(s) and/or image(s). Coordinate determining module 240 may also be configured to determine a reference zone and the coordinates (2D or 3D) thereof according to the received video(s) and/or image(s).

In some embodiments, the target identified by coordinate determining module 240 may be a still or a moving object. The target may be a pixel, a pixel group, or the like, or any combination thereof, included in the video(s) and/or image(s). In some embodiments, coordinate determining module 240 may be configured to identify the target by detecting a change in the pixel value of a pixel or changes in the pixel values of a pixel group by comparing the image (or an image frame of the video) with a background image (or a background image frame). In some embodiments, coordinate determining module 240 may be configured to identify the target by detecting a change in the pixel value(s) of a pixel or a pixel group between sequential frames. In some embodiments, coordinate determining module 240 may be configured to determine whether the change in pixel value(s) of the pixel or the pixel group equals to or exceeds a threshold. If so, coordinate determining module 240 may identify the pixel or the pixel group as a target. In some embodiments, the pixel value(s) of a pixel or pixel group may include the information relating to position, depth, color, grey level, or the like, or any combination thereof.

In some embodiment, coordinate determining module 240 may be configured to recognize an object and identify the recognized object as the target. Merely by way of example, coordinate determining module 240 may be configured to recognize a human face in the video and/or image and identify the human face as a target.

In some embodiments, the target may be a person, an animal, a vehicle, a watercraft, a light emitting diode (LED) emitter, an infrared (IR) device, an audio emitter, a radio frequency (RF) emitter, a pre-determined configuration pattern, or any observable object, or the like, or any combination thereof.

In some embodiments, coordinate determining module 240 may also be configured to determine the 3D coordinates of the target according to the video and/or image having depth information acquired by the video acquiring module 220. In some embodiments, coordinate determining module 240 may be configured to determine the 3D coordinates of the target according to the video and/or image with 2D information captured by video acquiring module 220 from different shooting angles. In some embodiments, coordinate determining module 240 may be configured to determine the 3D coordinates of the target according to the 3D video and/or image acquired by video acquiring module 220. In some embodiments, coordinate determining module 240 may be configured to determine the 3D coordinates of the target according to a 3D image reconstructed by 3D reconstruction module 270 based on one or more 2D images or video frame images as described elsewhere in this disclosure.

In some embodiments, coordinate determining module 240 may be configured to determine a reference zone in the video and/or image. Coordinate determining module 240 may further be configured to determine the coordinates (2D or 3D) of the reference zone. In some embodiments, the reference zone may be defined by the user. For example, the user may input the 3D coordinates of the reference zone via the input of video surveillance system 200 (not shown). In some embodiment, coordinate determining module 240 may be configured to recognize an object and determining the recognized object as the reference zone. Merely by way of example, coordinate determining module 240 may be configured to recognize a door in the video and/or image and identify the door as the reference zone. The reference zone may be a ray/line, a plane, or the like, or any combination thereof, defined in a 3D space. In some embodiments, the reference zone may be perpendicular to the ground in the 3D space. Intersecting part of the reference zone and the ground may be a straight line, a line segment, a broken line, or the like, or any combination thereof. In some embodiments, the reference zone may include two or more planes that are perpendicular to the ground.

The reference zone can be created in different ways. For example, an intersecting line between the reference zone and the ground may be first defined, which may then be extended upward from the ground into the 3D space to form the reference zone. The reference zone may have a predetermined height or an infinite height. In some embodiments, the reference zone formed may be perpendicular to the ground.

The reference zone may be defined by delimiting a convex polygon. The lower boundary of the convex polygon may be the intersecting line between the reference zone and the ground. In some embodiments, the convex polygon (i.e., the reference zone) may be perpendicular to the ground. As yet another example, the reference zone may be generated according to the distance between the reference zone and the device capturing the video and/or image (i.e., video acquiring module 220 or camera 110). The reference zone may be defined as an area that is at a predetermined distance from the device capturing the video and/or image (i.e., video acquiring module 220 or camera 110). In some embodiments, the upper and lower boundary of the convex polygon (i.e., the reference zone) may be defined by the user.

Event determining module 260 may be configured to determine an event according to the determined 3D coordinates of the target and the 3D coordinates of the reference zone. Merely by way of example, event determining module 260 may analyze the 3D coordinates of the target and the reference zone. Event determining module 260 may also determine whether the target enters the reference zone based on the analysis. If so, event determining module 260 may determine an event (e.g., the targets enters certain restricted area).

Trail determining module 250 may be configured to determine the position of the target at different time points. For example, trail determining module 250 may be configured to determine the pixel position of the target in consequential video frames. Trail determining module 250 may further be configured to generate a trail of the target over the time period based on the determined positions of the target. Trail determining module 250 may also be configured to transmit the position information and/or trail information of the target over the period of time to coordinate determining module 240. Coordinate determining module 240 may be configured to determine the 3D coordinate information of the target over the period of time based on the received position information and/or trail information. Coordinate determining module 240 may further be configured to determine the 3D coordinate information of the reference zone over the period of time. Event determining module 260 may be configured to determining an event according to the 3D coordinate information of the target and the 3D coordinate information of the reference zone over the period of time.

In some embodiment, if an event is detected (e.g., the target is determined to have across the reference zone), event determining module 260 may be configured to transmit an action trigger to action module 290, which may then generate an alert and transmit the alert to the user via, for example, user device 140. The alert may be in form of message, sound, image, light, flash light, or the like, or any combination thereof. In some embodiments, one or more video frames of the video (or one or more images) representing the event may be identified and transmitted to the user.

In some embodiments, event determining module 260 may be configured to determine a potential event (instead of an event) included in a plurality of video images according to the determined 3D coordinates of the target and the 3D coordinates of the reference zone. Event determining module 260 may also determine the number of the video images that include the potential event and whether this number equals to or exceeds a threshold. If so, event determining module 260 may identify the potential event as an event. For example, event determining module 260 may identify that a target being in a reference zone in a video frame as a potential event. Event determining module 260 may also determine the number of the video frames in which the potential event is also detected. Event determining module 260 may further determine whether this number equals to or exceeds a threshold. If so, event determining module 260 may identify the potential event as an event. Otherwise, event determining module 260 may ignore the potential event. In another example, event determining module 260 may determine a period of time during which a potential event lasts by analyzing sequential video frames. Event determining module 260 may further determine whether the period of time equals to or exceeds a threshold. If so, event determining module 260 may identify the potential event as an event. Otherwise, event determining module 260 may ignore the potential event.

Target analyzing module 280 may be configured to determine a type of the target. Target analyzing module 280 may transmit the information relating to the determined type of the target to action module 290 and/or event determining module 260 for determining an event and/or an action as described elsewhere in this disclosure. The information relating to the type of the target may include position information, shape information, color information, depth information, or the like, or any combination thereof.

Figure 3:
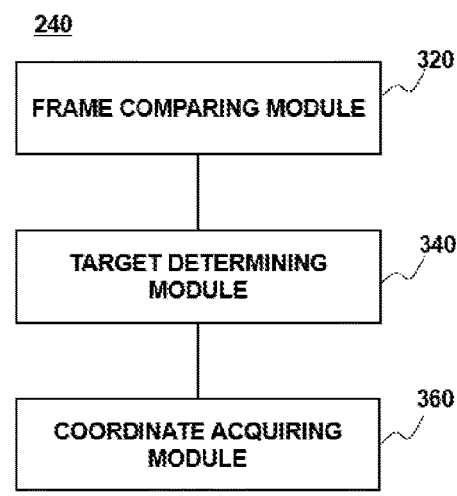
FIG. 3 is a schematic diagram illustrating an exemplary coordinate determining module used in the video surveillance system illustrated in FIG. 2 according to some embodiments.

Referring FIG. 3, coordinate determining module 240 may include a frame comparing module 320, a target determining module 340, and a coordinate acquiring module 360. In some embodiments, frame comparing module 320 may be configured to detect the change in the pixel value(s) of a pixel or a pixel group by comparing a video frame (or an image) with a background video frame (or a background image). In some embodiments, frame comparing module 320 may be configured to detect the change in the pixel value(s) of a pixel or a pixel group by comparing a video frame with a sequential video frame. In some embodiment, the pixel value may include the information of position, depth, color, grey level, or the like, or any combination thereof. Frame comparing module 320 may also identify the pixel or the pixel group with changed pixel value(s). Frame comparing module 320 may further transmit the information relating to the identified pixel or pixel group to target determining module 340 for further processing.

Target determining module 340 may be configured to set the pixel or the pixel group identified by frame comparing module 320 as the target. In some embodiments, target determining module 340 may be configured to determine whether the change in the pixel value(s) is equal to or exceeds a threshold. If so, target determining module 340 may identify the pixel or the pixel group as a target. In some embodiments, target determining module 340 may be configured to perform de-noising and/or error eliminating processes before determining whether the identified pixel or the pixel group is the target. Target determining module 340 may further transmit the information relating to the identified target to coordinate acquiring module 360 for determining the coordinates of the target.

Figure 4:
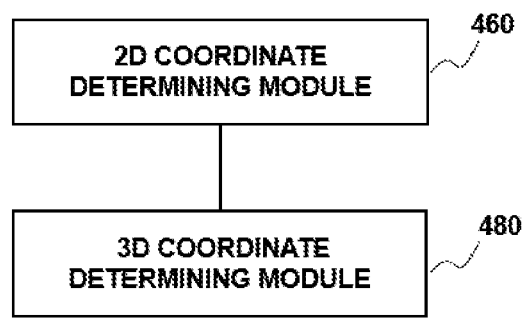
FIG. 4 is a schematic diagram illustrating an exemplary coordinate acquiring module used in the video surveillance system illustrated in FIG. 2 according to some embodiments.

Referring to FIG. 4, coordinate acquiring module 360 may include a 2D coordinate determining module 460 and a 3D coordinate determining module 480. 2D coordinate determining module 460 may be configured to determine the 2D coordinates of the target. 3D coordinate determining module 480 may be configured to determine the 3D coordinates of the target according to the determined 2D coordinates of the target as described elsewhere in the disclosure.

Figure 5:
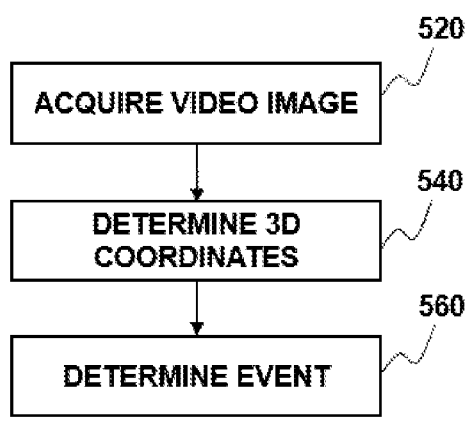
FIG. 5 is a flowchart of an exemplary process for determining an event according to some embodiments.

FIG. 5 is a flowchart of an exemplary process 500 for determining an event based on a video frame or an image. At 520, video acquiring module 220 may acquire a video or an image. In some embodiments, video acquiring module

220 may capture a video or an image. Video acquiring module 220 may further be configured to capture an image or a video at different shooting angles. In some embodiments, video acquiring module 220 may capture video(s) and/or image(s) from different positions and/or at different shooting angles. In some embodiments, video acquiring module 220 may also generate one or more 3D videos and/or 3D images based on 2D video(s) and/or 2D images captured by one or more 2D cameras. In some embodiments, video acquiring module 220 may capture video(s) and/or image(s) having depth information. In some embodiments, video acquiring module 220 may capture 3D images at different positions around the same time.

Alternatively or additionally, video acquiring module 220 may receive one or more videos and/or images (2D and/or 3D) from camera 110 via network 130. For example, video acquiring module 220 may receive 2D videos and/or images captured by one 2D camera (e.g., camera 110 or part thereof) at different shooting angles. In some embodiments, video acquiring module 220 may further be configured to receive 2D videos and/or images captured by two or more 2D cameras (e.g., camera 110 or part thereof) from different positions and/or at different shooting angles. In some embodiments, video acquiring module 220 may receive 2D and/or 3D videos and/or images captured by one or more 3D cameras (e.g., camera 110 or part thereof). Video acquiring module 220 may further generate one or more 3D images based on 2D images received from camera 110. Alternatively or additionally, 3D reconstruction module 270 may generate one or more 3D images based on 2D images received from video acquiring module 220 (or camera 110). For example, 3D reconstruction module 270 may create one or more 3D images with the 2D images acquired by video acquiring module 220 using an active method, a passive method, etc. The active method may actively interfere with the reconstructed object, either mechanically or radio metrically using rangefinders. For example, the active method may include a range data method, a mechanical method, etc. The passive method may use a sensor to measure the radiance reflected or emitted by the object's surface to infer the object's 3D structure through image understanding. For example, the passive method may comprise a monocular cues method, a binocular stereo vision, etc.

At 540, coordinate determining module 240 may be configured to analyze the video image and determine 3D coordinates of a target included in the video image. Coordinate determining module 240 may also be configured to determine a reference zone and the coordinates (2D or 3D) thereof according to the received video(s) and/or image(s).

At 560, event determining module 260 may determine an event according to the coordinate information of the target and the reference zone. For example, event determining module 260 may determine the position relationship between the target and the reference zone based on the coordinate information thereof. Event determining module 260 may further determine an event based on the determined position relationship between the target and the reference zone. Merely by way of example, event determining module 260 may determine that the target enters a reference zone according to the coordinate information of the target and the reference zone and identify the target and/or the action thereof as an event. In some embodiments, the position relationship between the target and the reference zone may include the target being inside of the reference zone; the target being outside of the reference zone; the target locating on the boundary of the reference zone; the target passing through a boundary of the reference zone from inside or outside of the reference zone; the target moving away from the reference zone without passing through the reference zone; the target approaching the reference zone without passing through the reference zone, or the like, or any combination thereof.

Figure 6:
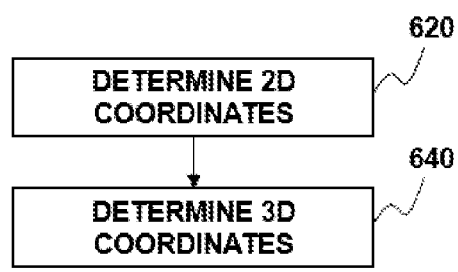
FIG. 6 is a flowchart of an exemplary process for determining 3D coordinates used in the event determining process illustrated in FIG. 5 according to some embodiments.

In some embodiments, the video image acquired at 520 may be analyzed at 540 for determining the coordinates of the target and the reference zone based on an exemplary process 600 shown in FIG. 6. As illustrated in FIG. 6, at 620, 2D coordinate determining module 460 may determine 2D coordinates of the target and the reference zone. In some embodiments, target determining module 340 may determine a target according to the method at 540 as described elsewhere in this disclosure.

At 640, coordinate determining module 240 may determine 3D coordinates of the target and the reference zone according to 2D coordinates of the target determined at 620. In some embodiments, coordinate determining module 240 may determine the 3D coordinates based on the 3D image(s) reconstructed by 3D reconstruction module 270 using 2D images acquired by video acquiring module 220. In some embodiments, 3D reconstruction module 270 may utilize an active method and/or a passive method to generate 3D image(s) based on 2D images. The active method may actively interfere with the reconstructed object, either mechanically or radio metrically using rangefinders. For example, the active method may comprise a range data method, a mechanical method, etc. The passive method may not interfere with the reconstructed object. The passive method may use a sensor to measure the radiance reflected or emitted by the object's surface to infer its 3D structure through image understanding. For example, the passive method may comprise a monocular cues method, a binocular stereo vision, etc.

In some embodiments, coordinate determining module 240 may transmit the coordinate information of the target and reference zone to event determining module 260, which may determine an event at 560 described above.

Figure 7:
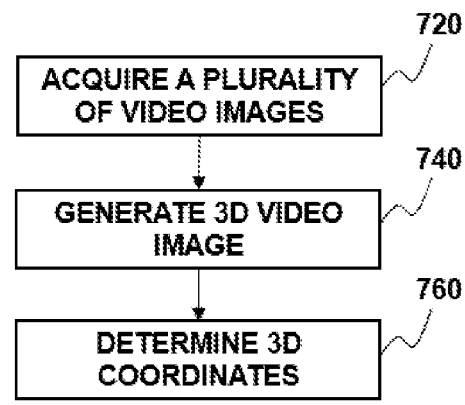
FIG. 7 is a flowchart of an exemplary process for acquiring video image and determining 3D coordinates used in the event determining process illustrated in FIG. 5 according to some embodiments.

Referring back to FIG. 5, at 540, the 3D coordinates of the target and the reference zone may be determined based on an exemplary process 700 shown in FIG. 7. At 720, video acquiring module 220 may acquire a plurality of video images of a same monitoring area. In some embodiments, camera 110 (which may be part of video acquiring module 220) may capture the plurality of 2D video images of the monitoring area at different shooting positions and/or at different shooting angles simultaneously. Merely by way of example, camera 110 may be a binocular stereo visual system. In some embodiments, the binocular stereo visual system may include two or more 2D cameras.

At 740, 3D reconstruction module 270 may generate a 3D video image by reconstructing the plurality of 2D video images. At 760, coordinate determining module 240 may determine 3D coordinates of the target and the reference zone according to 3D video image generated at 740. In some embodiments, target determining module 340 may determine the target at 540 described above.

Coordinate determining module 240 may transmit the coordinate information of the target and reference zone to event determining module 260, which may determine an event at 560 as described elsewhere in this disclosure.

Figure 8:
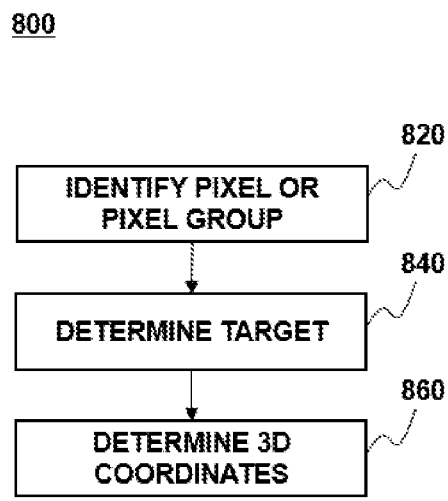
FIG. 8 is a flowchart of an exemplary process for determining 3D coordinates used in the event determining process illustrated in FIG. 5 according to some embodiments.

In some embodiments, the video image acquired at 520 may be analyzed at 540 for determining the coordinates of the target and the reference zone based on an exemplary process 800 shown in FIG. 8. As illustrated in FIG. 8, at 820, frame comparing module 320 may identify in the video image a pixel or a pixel group that has changing pixel value(s) ("changing pixel(s)" or "changing pixel group(s)"). For example, frame comparing module 320 may identify the changing pixel(s) or the changing pixel group(s) by comparing two or more sequential video frames. In some embodiments, the video image may include a 2D image, a 3D image, a depth image, or the like, or any combination thereof.

At 840, target determining module 340 may determine a target according to the information relating to the identified changing pixel(s) or pixel group(s). In some embodiments, target determining module 340 may identify a target from the changing pixels or the changing pixel groups. In some embodiments, target determining module 340 may be configured to determine whether the change in the pixel value(s) is equal to or exceeds a threshold. If so, target determining module 340 may identify the pixel or the pixel group as a target. In some embodiments, target determining module 340 may be configured to perform de-noising and/or error eliminating processes before determining whether the identified pixel or the pixel group is the target. Target determining module 340 may further transmit the information relating to the identified target to coordinate acquiring module 360 for determining the coordinates of the target.

At 860, coordinate determining module 240 may determine 3D coordinates of the identified target and the reference zone. In some embodiments, coordinate determining module 240 may determine 3D coordinates of the target and the reference zone according to the 2D coordinates of the target and the reference zone. The 2D coordinates may be 3D reconstructed to obtain the 3D coordinates. In some embodiments, coordinate determining module 240 may determine 3D coordinates of the target and the reference zone according to the depth information. Coordinate determining module 240 may transmit the coordinate information of the target and reference zone to event determining module 260, which may determine an event at 560 described above.

Figure 9:
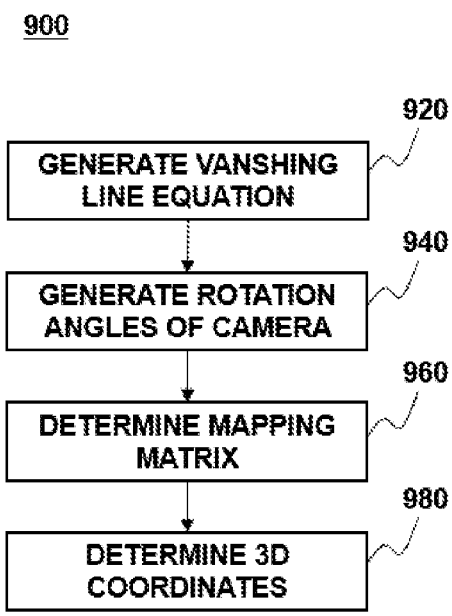
FIG. 9 is a flowchart of an exemplary process for determining 3D coordinates used in the event determining process illustrated in FIG. 5 according to some embodiments.

In some embodiments, the video image acquired at 520 may be analyzed at 540 for determining the coordinates of the target and the reference zone based on an exemplary process 900 shown in FIG. 9. As illustrated in FIG. 9, at 920, coordinate determining module 240 may generate a vanishing line equation. Parallel lines in the real world may be projected on the image plane to form points of intersection. The vanishing line may be consist of the points in the image plane that are intersections of the projections of the parallel lines in space on to the image plane. In some embodiments, the vanishing line equation may be generated according to the information of heights of a reference object with respect to three different positions in the ground plane. The three different positions may not be in a straight line. The information of the heights may be represented with pixels.

At 940, coordinate determining module 240 may determine a rotation angle of the camera capturing the video image (i.e., camera 110 or part thereof). The rotation angle may be an angle of the camera with respect to an axis. In some embodiments, coordinate determining module 240 may identify in the ground plane in the image a straight line (or a segment thereof) having a known length. Coordinate determining module 240 may further determine the rotation angle(s) of the camera with respect to the X axis and/or the Y axis based on the length of the identified straight line (or the segment thereof). In some embodiments, the rotation angle may include an angle of the camera with respect to the X axis, the Y axis, the Z axis, or the like, or any combination thereof. The rotation angle may be represented according to a length information of the straight line (or the segment thereof). The length of the straight line (or the segment thereof) in the image may be represented by its pixel information.

At 960, coordinate determining module 240 may determine a mapping matrix for correlating the 2D coordinates of the identified target and reference zone in the 2D space to the 3D coordinates of the target and reference zone in the 3D space according to the vanishing line equation and the rotation angle obtained respectively at 920 and 940.

At 980, coordinate determining module 240 may determine the 3D coordinates of the target and reference zone based on the 2D coordinate information of the target and reference zone, and the mapping matrix generated at 960.

In some embodiments, coordinate determining module 240 may determine the 3D coordinate information of the target and reference zone from a 2D video image using the following process. A plane of surveillance may first be determined. The plane of surveillance may be calibrated. A Euclidean distance between two arbitrary points in the real world coordinate system may be obtained. The corresponding relationship between the 2D image and the 3D object may be represented as the equation (1) bellow.

$$\lambda \begin{bmatrix} u \\ v \\ 1 \end{bmatrix} = P \begin{bmatrix} X \\ Y \\ Z \\ 1 \end{bmatrix}, \qquad (1)$$

$\lambda$ may be a distortion coefficient of the camera (i.e., camera 110 or part thereof). Generally, $\lambda$ equals to 1 for most cameras given that the distortion coefficient of most cameras is relative small. The mapping matrix P may be determined according to two rotation angles and the vanishing line equation. The two rotation angles may be $\alpha$ and $\beta$, $\alpha$ may be a tilt angle between the camera with respect to the X axis. $\beta$ may be a pan angle of the camera with respect to the Y axis. The detail description of determining the mapping matrix P may be found in the reference entitled "Self Calibration of a camera from video of a walking human" by Fengjun Lv, Tao Zhao and Ram Nevatia (ICPR, 2002). A such, the vanishing line equation may be generated according to the height information of a reference object with respect to the ground plane at three different positions in the ground plane of the image, and the position of the reference object with respect to the ground plane in the real world is known (which may be represented by the pixel information of the object). The three different positions may not be in a straight line. Angles $\alpha$ and $\beta$ may be determined according to the length information of the straight line with respect to the ground plane of the image. The mapping matrix P may be obtained to calibrate the plane of surveillance. In some embodiments, the mapping matrix P may be determined using the following method.

A. A user may identify the ground plane in the video image. Two arbitrary points may be identified by the user. The pixel positions of the two identified points may be $(u_1, v_1)$ and $(u_2, v_2)$. The Euclidean distance between the two points in the real-world coordinate system may be obtained as d.

B. An optimal $\alpha$ and an optimal $\beta$ may be calculated. First, $\alpha$ and $\beta$ may be discretized from 0 degree to 360 degrees. Every possible combination of $\alpha$ and $\beta$, $(\alpha_i, \beta_i)$, may be formed as a mapping matrix $P_i$. The pixel position $(u_1, v_1)$ and $(u_2, v_2)$ may be determined from step A described above and the mapping matrix $P_i$ may be determined to generate a 3D coordinate in the real world. The Euclidean distance $d_i$ may be determined according to the 3D coordinate in the real world. The $d_i$ may be compared with d to obtain a corresponding $(\alpha_i, \beta_i)$ with a minimum error. The corresponding $(\alpha_i, \beta_i)$ may be set as the parameters of the camera.

Angles $\alpha$ and $\beta$ may be discretized from 0 degree to 360 degrees. For example. $\alpha$ and $\beta$ may be any degree between 0 to 360 degrees (i.e., 1 degree, 2 degrees, . . . 360 degrees). Each possible angle value may be combined as a candidate combination ($\alpha i, \beta i$).

Accordingly, the equation (1) above may be transformed as equation (2):

$$\begin{bmatrix} X \\ Y \\ Z \\ 1 \end{bmatrix} = \lambda P^{-1} \begin{bmatrix} u \\ v \\ 1 \end{bmatrix}, \quad (2)$$

wherein $P^{-1}$ may be an inverse matrix of the matrix P. $P^{-1}P=1$, 1 may be a 3×3 unit matrix. The matrix P may be a 3×4 matrix. In some embodiments, the calibrated point(s) may be on the ground plane in the real world, and the coordinate of such calibrated point(s) along the Z axis may be 0. As such, the matrix P may be a 3×3 matrix to be inversed.

$(u_1, v_1)$ and $(u_2, v_2)$ may be determined in the equation (2) to generate two real-world coordinates $(X_1, Y_1, Z_1)$ and $(X_1, Y_1, Z_1)$. The Euclidean distance $d_i$ may be calculated according to $\sqrt{(X_1-X_2)^2+(Y_1-Y_2)^2+(Z_1-Z_2)^2}$. The error $\Delta(\alpha i, \beta i)$ may be calculated according to $d_i$ and d. Merely by way of example, the error $\Delta(\alpha i, \beta i)$ may be defined as $|\sqrt{(X_1-X_2)^2+(Y_1-Y_2)^2+(Z_1-Z_2)^2}-d|$, or $|(X_1-X_2)^2+(Y_1-Y_2)^2+(Z_1-Z_2)^2-d^2|$.

A set of parameters of $\alpha'', \beta''$ with the smallest error may be chosen as the optimal parameters according to equation (3):

$$\alpha^*, \beta^* = \arg\min_{(\alpha_i, \beta_i)} \Delta(\alpha_i, \beta_i), \quad (3)$$

C. The vanishing line equation may be calculated. In some embodiments, the vanishing line equation may be determined based on the methods described in the reference entitled "Single-View Metrology: Algorithms and Applications, proceeding of 24 DAGM symposium on Pattern Recognition" by Antonio Criminisi.

D. The mapping matrix P may be determined. The mapping matrix P may be determined according to equation (4) after obtaining the parameters of the camera:

$$P=K[R|t], \quad (4)$$

wherein, the matrix P may be a matrix of 3×4. The matrix K may be a 3×3 matrix of intrinsic parameters:

$$K = \begin{bmatrix} f & 0 & u_0 \\ 0 & f & v_0 \\ 0 & 0 & 1 \end{bmatrix},$$

wherein, $(u_0, v_0)$ may be an intrinsic point of the video image. In some embodiments, the intrinsic point may be a central point. f, $f=\sqrt{-(v_1-v_2)(v_2-v_1)}$ may be the focal length of the video capturing module. R may be a 3×3 rotation matrix obtained according to equation (5):

$$R = \begin{bmatrix} \cos\gamma & -\sin\gamma & 0 \\ \sin\gamma & \cos\gamma & 0 \\ 0 & 0 & 1 \end{bmatrix} \begin{bmatrix} 1 & 0 & 0 \\ 0 & \cos\beta & -\sin\beta \\ 0 & \sin\beta & \cos\beta \end{bmatrix} \begin{bmatrix} \cos\alpha & 0 & -\sin\alpha \\ 0 & 1 & 0 \\ \sin\alpha & 0 & \cos\alpha \end{bmatrix}, \quad (5)$$

wherein $\alpha$ may be a tilt angle of the camera with respect to the X axis, $\beta$ may be a pan angle of the camera with respect to the Y axis. $\gamma$ may be a yaw angle of the camera with respect to the Z axis, and $\gamma$ may be approximated with a dip angle of the vanishing line with respect to the horizontal direction. Wherein $$\alpha = \arctan\left(\frac{(u_{v_x}-u_o)\cos\beta}{f}\right), \beta = \arctan\left(\frac{u_o-u_{v_x}}{f}\right).$$

t may be a 3×1 matrix, which may be represented as $t=R[0\ H_c\ 0]^T$. Here, $H_c$ may be a distance between the camera and the ground plane (the height of the camera from the ground). T may be a transpose operation of $[0\ H_c\ 0]$.

E. In some embodiments, the reference zone and the target may be in a same horizontal plane, and the coordinates of the reference zone and the target along Z axis may be the same. Accordingly, the target and reference zone's coordinates along X and Y axis may be determined to obtain their coordinates in the 3D space. Merely by way of example, the coordinates of any point in the ground plane in the 3D space along X and Y axis may be determined according to equation (6):

$$\begin{bmatrix} X \\ Y \\ 1 \end{bmatrix} = \lambda P^{-1} \begin{bmatrix} u \\ v \\ 1 \end{bmatrix}, \quad (6)$$

wherein $P^{-1}$ may be a 3×3 inverse matrix after degradation processing. The mapping equation (6) for transforming 2D coordinates to 3D coordinates may thus be obtained.

In some embodiments, the image may be pre-processed before calibrating the plane of surveillance. The pre-processing method may include noise filtering, image enhancement and/or electronic image pretreatment, or the like, or any combination thereof.

Figure 10:
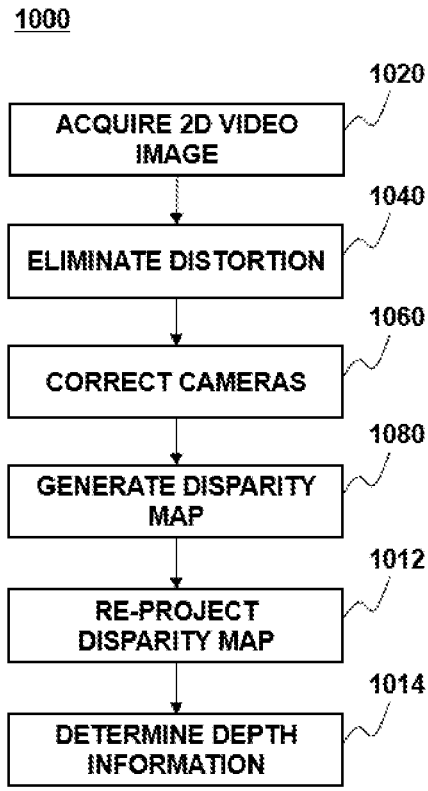
FIG. 10 is a flowchart of an exemplary process for acquiring video image and determining 3D coordinates used in the event determining process illustrated in FIG. 5 according to some embodiments.

Referring back to FIG. 5, the coordinates of the target and reference zone may be determined based on an exemplary process 1000 shown in FIG. 10. At 1020, video acquiring module 220 may acquire a plurality of video images. Merely by way of example, video acquiring module 220 may acquire a plurality of 2D video images, which may then be reconstructed to generate one or more 3D video images as described elsewhere in this disclosure.

In some embodiments, video acquiring module 220 may include a binocular stereo vision system having two cameras. The binocular stereo vision system may be installed on a stable platform. The intrinsic parameters and positions of the cameras may be the same when the cameras capture a video or image. The intrinsic parameter may include focal length, refractive index, Abbe number, optical length, or the like, or any combination thereof. The cameras may be re-calibrated if the intrinsic parameters and positions are changed. The images from two cameras may be analyzed to extract depth information. In some embodiments, the focal length and the baseline length of the cameras may increase. The monitoring area may be close to the binocular stereo vision system, and the rotation angles of the cameras and the optical axis may be small.

At 1040, 3D reconstruction module 270 may be configured to eliminate or alleviate distortion of the cameras. In some embodiments, 3D reconstruction module 270 may be configured to eliminate distortion of the cameras according to a mathematical method. In some embodiments, the distortion may include a radial distortion and/or a tangential distortion of the cameras. The radial distortion may include barrel distortion, pincushion distortion, mustache distortion, etc. In the embodiments of the radial distortion, the imaging position may be corrected according to equation (7):

$$\begin{cases} x_1 = x(1 + k_1 r^2 + k_2 r^4 + k_3 r^6) \\ y_1 = y(1 + k_1 r^2 + k_2 r^4 + k_3 r^6) \end{cases}, \quad (7)$$

wherein $x_1$ and $y_1$ may be new positions after correction, and x and y may be original positions. Merely by way of example, the new positions may be determined using the first two terms in the formula (7)

$$\left(\text{i.e., } \begin{cases} x_1 = x(1 + k_1 r^2) \\ y_1 = y(1 + k_1 r^2) \end{cases}\right).$$

In some other embodiments, the new positions may be determined using the third term in the formula (7).

For a tangential distortion, the imaging position may be calibrated according to equation (8):

$$\begin{cases} x_2 = x + [2p_1 y + p_2(r^2 + 2x^2)] \\ y_2 = y + [p_1(r^2 + 2y^2) + 2p_2 x] \end{cases}, \quad (8)$$

wherein $x_2$ and $y_2$ may be new positions after calibration and x and y may be original positions.

At 1060, 3D reconstruction module 270 may configured to correct the camera. In some embodiments, 3D reconstruction module 270 may adjust the angle(s) and position(s) of the cameras. 3D reconstruction module 270 may output one or more corrected images. In some embodiments, the corrected image may be line aligned. The images may be on a same plane. The lines in the images may be tightly aligned.

At 1080, 3D reconstruction module 270 may compare the images. In some embodiments, one or more same characteristics may be found within the field of view of the two cameras. A disparity map may be generated based on the comparison of the images. In some embodiments, the disparity in the images may be a difference on the X axis. In some embodiments, the disparity may be a coordinate difference. The coordinate difference may be an X/Y axis coordinate difference between a same coordinate within the plurality of 2D video images. Merely by way of example, the difference on the X axis may be defined as $x_1$-$x_2$.

At 1012, 3D reconstruction module 270 may re-project the disparity map. In some embodiments, 3D reconstruction module 270 may transform the disparity map into a distance according to a triangulation method. At 1014, 3D reconstruction module 270 may determine a depth information. The depth information may include information relating to the distance of a target from a camera. In some embodiments, the depth information Z may be calculated according to equation (9):

$$Z = \frac{fT}{x_1 - x_2}, \quad (9)$$

wherein $x_1$-$x_2$ may be a coordinate difference in the X axis, f may be a focal length, and T may be a center distance between the two cameras. In some embodiments, $x_1$-$x_2$ and f may be represented by pixel information, and T may be set at millimeters. Coordinate determining module 240 may determine coordinates of the target and reference zone according to the depth information acquired at 1014. Coordinate determining module 240 may transmit the coordinate information of the target and reference zone to event determining module 260, which may determine an event at 560 described above.

Figure 11:
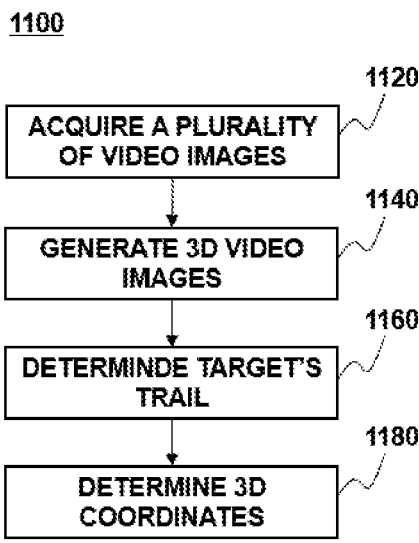
FIG. 11 is a flowchart of an exemplary process for acquiring video image and determining 3D coordinates used in the event determining process illustrated in FIG. 5 according to some embodiments.

Referring back to FIG. 5, the coordinates of the target may be determined based on an exemplary process 1100 shown in FIG. 11. In some embodiments, the target may be a moving one. At 1120, video acquiring module 220 may acquire a plurality of video images. In some embodiments, the plurality of video images may be captured by more than one camera (i.e., camera 110 or part thereof). In some embodiments, the plurality of video images may be captured by the cameras at different shooting positions. In some other embodiments, the plurality of video images may be two or more sequential video frames.

At 1140, 3D reconstruction module 270 may generate a 3D video image. In some embodiments, 3D reconstruction module 270 may generate the 3D video image according to a 3D reconstruction method as described elsewhere in this disclosure.

At 1160, trail determining module 250 may determine a target's moving trail according to two or more sequential 3D video images over a period of time. For example, trail determining module 250 may determine a target's moving trail according to two or more sequential 3D video images over a period of time. In some embodiments, trail determining module 250 may determine the target's moving trail from the 3D video image generated at 1140. In some embodiments, target determining module 340 may extract the target from two or more sequential 3D video images. In some embodiments, target determining module 340 may extract the target according to changing pixel information as described elsewhere in this disclosure. The changing pixel information may include changing 3D coordinates, changing color information, etc.

At 1180, coordinate determining module 240 may determine the target's 3D coordinates over the period of time according to the moving trail of the target. Coordinate determining module 240 may transmit the coordinate information of the target and reference zone to event determining module 260, which may determine an event at 560 described above.

Figure 12:
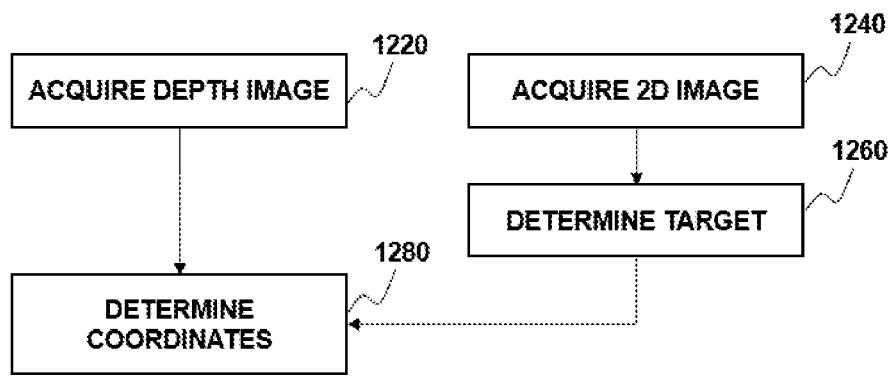
FIG. 12 is a flowchart of an exemplary process for acquiring video image and determining 3D coordinates used in the event determining process illustrated in FIG. 5 according to some embodiments.

Referring again to FIG. 5, the coordinates of the target may be determined based on an exemplary process 1200 shown in FIG. 12. In some embodiments, the target may be a moving one. At 1220, video acquiring module 220 may acquire a depth image. The depth information of the pixels in the image may be obtained.

At 1240, video acquiring module 220 may acquire a 2D image. In some embodiments, the 2D image may include the same area as the depth image. In some embodiments, video acquiring module 220 may include a 2D camera configured to acquire a 2D image. In some embodiments, the 2D camera and the depth image capturing module may be calibrated.

At 1260, target determining module 340 may determine a target according to the 2D image acquired at 1240. In some embodiments, the target may be any part that needed to be monitored. In some embodiments, the 2D image may be an image in color. Target determining module 340 may obtain color information. Target determining module 340 may determine the changing pixel(s) or the changing pixel group(s) in the 2D image according to the changing color information of the pixels. In some embodiments, target determining module 340 may determine the target according to the changing depth information in the depth image.

At 1280, coordinate determining module 240 may determine the 3D coordinates of the target and the reference zone according to the depth image and the 2D image. In some embodiments, coordinate determining module 240 may determine the corresponding pixels in the depth image with the pixels of the target in the 2D image. Coordinate determining module 240 may determine the target's 3D coordinates according to the depth information of the pixels. In some embodiments, coordinate determining module 240 may determine the target's 3D coordinates according to the corresponding pixels in the depth image.

Figure 13:
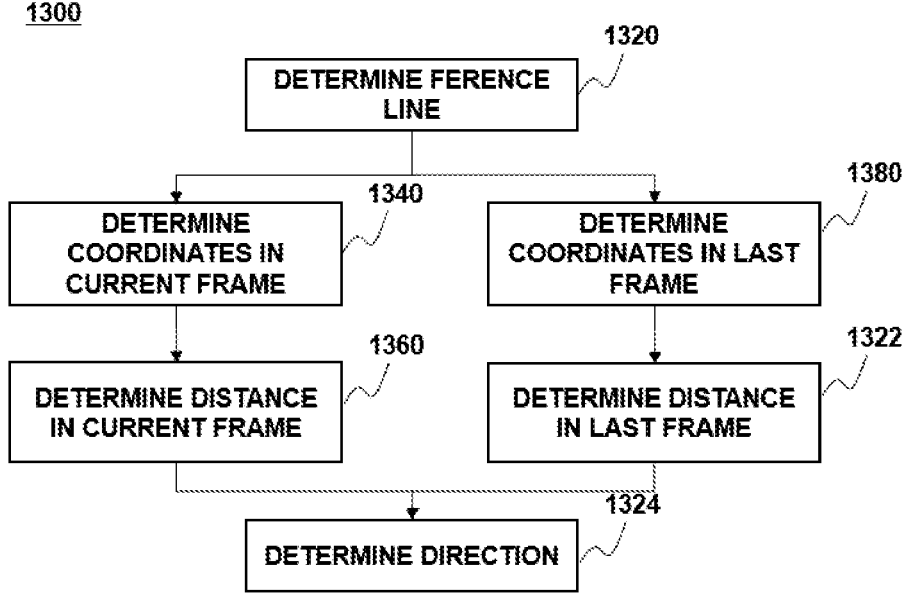
FIG. 13 is a flowchart of an exemplary process for determining event used in the event determining process illustrated in FIG. 5 according to some embodiments.

Referring back to FIG. 5, the 3D coordinates determined at 540 may be analyzed at 560 for determining the event based on an exemplary process 1300 shown in FIG. 13. As illustrated in FIG. 13, at 1320, event determining module 260 may determine a reference line. In some embodiments, event determining module 260 may choose a straight line through the center of the image as the reference line. The straight line may be vertical to the lower boundary of the image.

At 1340, event determining module 260 may determine the coordinates of a current frame. In some embodiments, event determining module 260 may determine angles of the reference line and connecting lines as $\theta_1, \theta_2, \ldots, \theta_m$. The connecting lines may start from each endpoint of segments in the reference zone to the reference point, wherein m may be the number of the endpoints. The angle of a connecting line started from the target point to the reference point may be determined as $\alpha$. The angles $\theta_1, \theta_2, \ldots, \theta_m$ may be compared with the angle $\alpha$. The value of $\theta_1, \theta_2, \ldots, \theta_m$ may be sorted. The minimum value $\theta$ greater than $\alpha$ may be chosen as $T_1$. The maximum value $\theta$ less than $\alpha$ may be chosen as $T_2$. The endpoints corresponding to $T_1$ and $T_2$ may be transformed to 3D coordinates, which may be recorded as $(x_1, y_1)$ and $(x_2, y_2)$, respectively. The moving target may be transformed as 3D coordinates $(x, y)$. The reference point may be transformed as 3D coordinates $(X, Y)$.

At 1360, event determining module 260 may determine the distances between the 3D coordinates of the endpoints and the 3D coordinate of the reference point in the current frame. In some embodiments, event determining module 260 may determine the distances between the 3D coordinates $(x_1, y_1)$, $(x_2, y_2)$ and the 3D coordinate $(X, Y)$ as $d_1$ and $d_2$. Event determining module 260 may determine the distance between the target's 3D coordinate $(x, y)$ and the reference point's 3D coordinate $(X, Y)$ as d according to equation (10).

$$d=[(X-x)^2+(Y-y)^2]^{1/2}. \quad (10)$$

In the current frame, the distance d may be compared with distances $d_1$ and $d_2$. There may be three results: $d>d_1$ and $d>d_2$, $d<d_1$ and $d<d_2$, and $d_2<d<d_1$ or $d_1<d<d_2$. The three results may be recorded as 1.1, 1.2 and 1.3, respectively.

At 1380, event determining module 260 may determine the coordinates of the last frame. In some embodiments, event determining module 260 may determine the angles of the reference line with respect to connecting lines as $\theta_1', \theta_2' \ldots \theta_m'$. The connecting lines may start from each endpoint of segments in the reference zone to the reference point. m may be the number of the endpoints. The angle of a connecting line started from the target point with respect to the reference point may be determined as $\alpha'$. The angles $\theta_1', \theta_2' \ldots \theta_m'$ may be compared with the angle $\alpha'$. The value of $\theta_1', \theta_2' \ldots \theta_m'$ may be sorted. The minimum value $\theta'$ greater than $\alpha$ may be chosen as $T_1'$. The maximum value $\theta'$ less than $\alpha'$ may be chosen as $T_2'$. The endpoints corresponding to $T_1'$ and $T_2'$ may be transformed to 3D coordinates, which may be recorded as $(x_1', y_1')$ and $(x_2', y_2')$. The moving target may be transformed as 3D coordinate $(x', y')$. The reference point may be transformed as 3D coordinate $(X', Y')$.

At 1322, event determining module 260 may determine the distances between the 3D coordinates of the endpoints and the 3D coordinate of the reference point in the current frame. In some embodiments, event determining module 260 may determine the distances between the 3D coordinates $(x_1', y_1')$, $(x_2', y_2')$ and the 3D coordinate $(X', Y')$ as $d_1'$ and $d_2'$, respectively. Event determining module 260 may determine the distance between the target's 3D coordinate $(x', y')$ and the reference point's 3D coordinate $(X', Y')$ as d'.

In the last frame, the distance d' may be compared with distances $d_1'$ and $d_2'$. There may be three results: $d'>d_1'$ and $d'>d_2'$, $d'<d_1'$ and $d'<d_2'$, and $d_2'<d'<d_1'$ or $d_1'<d'<d_2'$. The three results may be recorded as 2.1, 2.2 and 2.3, respectively.

At 1324, event determining module 260 may determine the moving direction of the target according to the results.

The results—combination of 1.1 and 2.1: the moving target may always be at a larger distance from the reference point than the endpoints of the line segments in the reference zone from the reference point. Accordingly, the target may have not passed across the reference zone.

The results—combination of 1.1 and 2.2: the distance between the moving target and the reference point may change from being less to greater than the distance between the endpoints in the reference zone and the reference point. Accordingly, the target may have passed across the reference zone, and the moving direction may be from the inside of the reference zone to the outside.

The results—combination of 1.1 and 2.3: the distance between the moving target and the reference point may change from being less to greater than the distance between the endpoints in the reference zone and the reference point. Accordingly, the target may have passed across the reference zone, and the moving direction may be from the inside of the reference zone to the outside.

The results—combination of 1.2 and 2.1: the distance between the moving target and the reference point may change from being greater to less than the distance between the endpoints in the reference zone and the reference point. Accordingly, the target may have passed across the reference zone, and the moving direction may be from the outside of the reference zone to the inside.

The results—combination of 1.2 and 2.2: the moving target may always be at a smaller distance from the reference point than the endpoints of the line segments in the reference zone from the reference point. Accordingly, the target may have not passed across the reference zone.

The results—combination of 1.2 and 2.3: the distance between the moving target and the reference point may change from greater to less than the distance between the endpoints in the reference zone and the reference point. Accordingly, the target may have passed across the reference zone, and the moving direction may be from the outside of the reference zone to the inside.

The results—combination of 1.3 and 2.1: the distance between the moving target and the reference point may change from greater to less than the distance between the endpoints in the reference zone and the reference point. Accordingly, the target may have passed across the reference zone, and the moving direction may be from outside of the reference zone to the inside.

The results—combination of 1.3 and 2.2: the distance between the moving target and the reference point may change from less to greater than the distance between the endpoints in the reference zone and the reference point. Accordingly, the target may have passed across the reference zone, the moving direction may be from inside of the reference zone to the outside.

The results—combination of 1.3 and 2.3: the distance between the moving target and the reference point may always fall in between the distance between the endpoints in the reference zone and the reference point. The target may never pass across the reference zone.

In some embodiments, the target's 3D coordinate information may be under the coordinate system of the camera. The reference zone's 3D coordinate information may be under the ground coordinate system. The 3D coordinates of the reference zone and the target may be unified into a same coordinate system. For example, the target's 3D coordinate information may be unified into the ground coordinate system based on the relationship between the coordinate system of the camera and the ground. The reference zone may be perpendicular to the ground, event determining module 260 may determine the event based on the horizontal coordinate information of the target and the reference zone. For another example, the reference zone's 3D coordinate information may be unified into the coordinate system of the camera based on the relationship between the coordinate system of the camera and the real-world. Event determining module 260 may determine the event based on the position relationship between the target and the reference zone in the coordinate system of the camera.

In some embodiments, the 3D coordinate information of the target and the reference zone may be under a same coordinate system of the ground or the camera. Event determining module 260 may determine the event based on the position relationship between the target and the reference zone in the same coordinate system.

The position relationship between the target and the reference zone may include the target being inside the reference zone, the target being outside the reference zone, the target being within the reference zone, the target passing through the reference zone from the outside of the reference zone to the inside, the target passing through the reference zone inside to outside, the target moving from the outside of the reference zone to the inside without passing through the reference zone, the target moving from the inside of the reference zone to the outside without passing through the reference zone, or the like, or any combination thereof.

In some embodiments, action module 290 may determine an event according to the position relationship, an intrusion location, an intrusion direction, an intrusion target type, or the like, or any combination thereof. For example, an event may be triggered based on the position relationship between the target and the reference zone described above (e.g., the target moving across a boundary of the reference zone). In some embodiments, action module 290 may generate an alarm when an event is detected. The alarm may be in the form of, for example, sound, image, light, smell, fire, smoke, temperature, or the like, or any combination thereof.

In some embodiments, event determining module 260 may be configured to determine a potential event (instead of an event) included in a plurality of video images according to the determined 3D coordinates of the target and the 3D coordinates of the reference zone. Event determining module 260 may also determine the number of the video images that include the potential event and whether this number equals to or exceeds a threshold. If so, event determining module 260 may identify the potential event as an event. For example, event determining module 260 may identify that a target being in a reference zone in a video frame as a potential event. Event determining module 260 may also determine the number of the video frames in which the potential event is also detected. Event determining module 260 may further determine whether this number equals to or exceeds a threshold. If so, event determining module 260 may identify the potential event as an event. Otherwise, event determining module 260 may ignore the potential event. In another example, event determining module 260 may determine a period of time during which a potential event lasts by analyzing sequential video frames. Event determining module 260 may further determine whether the period of time equals to or exceeds a threshold. If so, event determining module 260 may identify the potential event as an event. Otherwise, event determining module 260 may ignore the potential event.

In some embodiments, the target in the identified event may be analyzed by, for example, target analyzing module 280 for determining one or more types of the target. The target type may be determined by comparing the target information included in the image(s) with a database of various target models. The target information may include shape information, color information, depth information, or the like, or any combination thereof. Merely by way of example, the target may include a person, an animal, a vehicle, a watercraft, a light emitting diode (LED) emitter, an infrared (IR) device, an audio emitter, a radio frequency (RF) emitter, a prescribed configuration pattern, or any observable object, or the like, or any combination thereof. Target analyzing module 280 may transmit the determine type(s) of the target (and/or the target information) to action module 290 for further processing. Action module 290 may generate an alarm based on the type(s) of the target. In some embodiments, action module 290 may generate an alarm for certain target types (e.g., a human being) only.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

We claim:

1. A system comprising:
an image sensor configured to capture an image including a reference zone;
a memory device that stores instructions; and
one or more processors that are configured to execute the instructions to:
determine 3D coordinates of a target comprised in the image;
determine 3D coordinates of the reference zone; and
identify an event according to the 3D coordinates of the target and the 3D coordinates of the reference zone, wherein identifying the event further includes identifying the event according to a distance between an endpoint of a segment in the reference zone and a reference point and a distance between the target and the reference point.

2. The system of claim 1, wherein the reference zone is perpendicular to a ground plane in the image.

3. The system of claim 1, wherein the one or more processors are further configured to:
identify a pixel or a pixel group in the image;
identify the pixel or the pixel group as the target; and
determine the 3D coordinates of the pixel or a pixel group.

4. The system of claim 1, wherein the image is a 2D image.

5. The system of claim 4, wherein the 3D coordinates of the targets are determined according to the 2D coordinates of the target.

6. The system of claim 1, wherein the image sensor is configured to capture one or more 2D images at different positions.

7. The system of claim 6, wherein determining the 3D coordinates of the target includes:
reconstructing a 3D image according to the one or more 2D images; and
determining the 3D coordinates of the target according to the reconstructed 3D image.

8. The system of claim 1, wherein the image sensor is configured to capture an image with depth information.

9. The system of claim 1, wherein identifying the event further includes:
   determining horizontal information of the 3D coordinates of the target and horizontal information of the 3D coordinates of the reference zone; and
   identifying the event based on the determined horizontal information of the 3D coordinates of the target and the reference zone.

10. The system of claim 1, wherein the one or more processors are further configured to:
   determine a trail of the target over a period of time;
   determine 3D coordinates of the trail of the target over the period of time; and
   determine the event according to the 3D coordinates of the trail of the target and 3D coordinates of the reference zone over the period of time.

11. The system of claim 1, wherein the event includes one of:
   the target locating inside of the reference zone;
   the target locating outside of the reference zone;
   the target locating on a boundary of the reference zone;
   the target passing through the reference zone from the outside of the reference zone to the inside of the reference zone;
   the target passing through the reference zone from the inside of the reference zone to the outside of the reference zone;
   the target leaving the reference zone without passing through the reference zone; or
   the target approaching the reference zone without passing through the reference zone.

12. A method comprising:
   capturing an image including a reference zone;
   determining 3D coordinates of a target comprised in the image;
   determining 3D coordinates of the reference zone; and
   identifying an event according to the 3D coordinates of the target and 3D coordinates of the reference zone, wherein identifying the event further includes identifying the event according to a distance between an endpoint of a segment in the reference zone and a reference point and a distance between the target and the reference point.

13. The method of claim 12, further comprising:
   identifying a pixel or a pixel group in the image;
   identifying the pixel or the pixel group as the target; and
   determining the 3D coordinates of the pixel or the pixel group.

14. The method of claim 12, wherein the image is a 2D image, and the 3D coordinates of the target is determined according to 2D coordinate of the target.

15. The method of claim 14, wherein the image is captured by an image sensor including a 2D camera.

16. The method of claim 12, wherein one or more 2D images are captured at different positions, and determining the 3D coordinates of the target includes:
   reconstructing a 3D image according to the one or more 2D images; and
   determining the 3D coordinates of the target according to the reconstructed 3D images.

17. The method of claim 16, wherein the image is captured by an image sensor including more than one camera.

18. The method of claim 12, wherein the image is captured with depth information.

19. The method of claim 12, further comprising the step of determining a type of the target.

20. A non-transitory computer readable medium embodying a computer program product, the computer program product comprising instructions configured to cause a computing device to perform a method comprising:
   capturing an image including a reference zone;
   determining 3D coordinates of a target comprised in the image;
   determining 3D coordinates of the reference zone; and
   identifying an event according to the 3D coordinates of the target and 3D coordinates of the reference zone, wherein identifying the event further includes identifying the event according to a distance between an endpoint of a segment in the reference zone and a reference point and a distance between the target and the reference point.

* * * * *